(12) United States Patent  (10) Patent No.: US 7,356,319 B2
Mason  (45) Date of Patent: Apr. 8, 2008

(54) REDUCED POWER CONSUMPTION

(75) Inventor: Ken Mason, Hampshire (GB)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/482,212

(22) Filed: Jul. 7, 2006

(65) Prior Publication Data

US 2007/0015480 A1    Jan. 18, 2007

Related U.S. Application Data

(63) Continuation of application No. 10/691,313, filed on Oct. 22, 2003, now Pat. No. 7,107,029.

(30) Foreign Application Priority Data

Oct. 16, 2003  (GB) ................................ 0324266.6

(51) Int. Cl.
*H04B 1/18* (2006.01)
*H04B 7/00* (2006.01)

(52) U.S. Cl. ............................. 455/184.1; 455/186.1; 455/458; 340/5.23; 340/7.32; 340/825.27; 375/316

(58) Field of Classification Search ............. 455/184.1, 455/183.2, 73, 95, 185.1, 186.1, 127.1, 412.1, 455/418, 458, 130, 514, 522, 550.1, 556.2
See application file for complete search history.

(56) References Cited

U.S. PATENT DOCUMENTS

| | | | |
|---|---|---|---|
| 4,905,234 A | 2/1990 | Childress et al. ........... | 370/349 |
| 5,475,863 A | 12/1995 | Simpson et al. ............ | 455/458 |
| 5,513,385 A | 4/1996 | Tanaka ...................... | 455/228 |
| 5,930,706 A | 7/1999 | Raith ......................... | 455/422 |
| 6,510,323 B1 * | 1/2003 | Stocker et al. .............. | 455/466 |
| 6,516,193 B1 * | 2/2003 | Salmela et al. ........... | 455/432.3 |
| 6,522,265 B1 | 2/2003 | Hillman et al. ............. | 340/988 |
| 6,931,451 B1 | 8/2005 | Logan et al. ............... | 709/231 |
| 2005/0102605 A1 | 5/2005 | Gupta ........................ | 714/776 |
| 2006/0009201 A1 * | 1/2006 | Gallagher et al. ........ | 455/414.1 |

FOREIGN PATENT DOCUMENTS

EP     0184606     6/1986

(Continued)

*Primary Examiner*—Tony T. Nguyen
(74) *Attorney, Agent, or Firm*—Harrington & Smith, PC (57) ABSTRACT

A radio frequency receiver for receiving supplementary data transmitted with a radio station signal. The supplementary data includes one or more information word fields containing supplementary data transmitted with the radio station signal. The receiver includes a host processor for processing the supplementary data; a supplementary data demodulator and decoder for demodulating and decoding a received radio signal to generate a stream of bits representing one or more information word fields; an information word type memory for storing one or more information word type fields; detection circuitry arranged to receive and compare the information word type field decoded by the supplementary data decoder with one or more information word type fields stored in the information word type memory, and to provide a matched condition signal in response to a match between one or more decoded information word type fields and one or more of the corresponding stored information word types fields. The receiver is arranged to, in response to the matched condition signal, cause the corresponding supplementary data to be processed by the host processor.

34 Claims, 7 Drawing Sheets

FOREIGN PATENT DOCUMENTS

| | | |
|---|---|---|
| EP | 0647041 A1 | 4/1995 |
| EP | 1 434 357 A2 | 6/2004 |
| EP | 1434357 A2 | 6/2004 |
| FR | 2699027 A1 | 6/1994 |
| FR | 2700629 A1 | 7/1994 |
| GB | 2275849 A | 9/1994 |
| GB | 2 324 228 A | 10/1998 |
| GB | 2324228 A | 10/1998 |
| GB | 2357667 A | 6/2001 |
| GB | 2 407 223 A | 4/2005 |
| GB | 2407223 A | 4/2005 |
| GB | 2 409 360 A | 6/2005 |
| GB | 2409360 A | 6/2005 |

\* cited by examiner

| | | | | | | | | | |
|---|---|---|---|---|---|---|---|---|---|
| 8 A | PI Code | Checkword + Offset A | GTC | 0 TP | PTY | Defined by CEN | Checkword + Offset B | Defined by CEN | Checkword + Offset C | Defined by CEN | Checkword + Offset D |
| B | PI Code | Checkword + Offset A | GTC | 1 TP | PTY | ODA according to 3.1.4 | Checkword + Offset B | PI Code | Checkword + Offset C' | ODA according to 3.1.4 | Checkword + Offset D |
| 9 A | PI Code | Checkword + Offset A | GTC | 0 TP | PTY | EWS assigned by each country | Checkword + Offset B | EWS assigned by each country | Checkword + Offset C | EWS assigned by each country | Checkword + Offset D |
| B | PI Code | Checkword + Offset A | GTC | 1 TP | PTY | ODA according to 3.1.4 | Checkword + Offset B | PI Code | Checkword + Offset C' | ODA according to 3.1.4 | Checkword + Offset D |
| 10 A | PI Code | Checkword + Offset A | GTC | 0 TP | PTY | 0 0 0 0 PTYN Seg Add Flag A/B | Checkword + Offset B | PTYN Segment | Checkword + Offset C | PTYN Segment | Checkword + Offset D |
| B | PI Code | Checkword + Offset A | GTC | 0 TP | PTY | ODA according to 3.1.4 | Checkword + Offset B | PI Code | Checkword + Offset C' | ODA according to 3.1.4 | Checkword + Offset D |
| 11 A | PI Code | Checkword + Offset A | GTC | 0 TP | PTY | ODA according to 3.1.4 | Checkword + Offset B | PI Code | Checkword + Offset C | ODA according to 3.1.4 | Checkword + Offset D |
| B | PI Code | Checkword + Offset A | GTC | 1 TP | PTY | ODA according to 3.1.4 | Checkword + Offset B | PI Code | Checkword + Offset C' | ODA according to 3.1.4 | Checkword + Offset D |
| 12 A | PI Code | Checkword + Offset A | GTC | 0 TP | PTY | ODA according to 3.1.4 | Checkword + Offset B | PI Code | Checkword + Offset C | ODA according to 3.1.4 | Checkword + Offset D |
| B | PI Code | Checkword + Offset A | GTC | 1 TP | PTY | ODA according to 3.1.4 | Checkword + Offset B | PI Code | Checkword + Offset C' | ODA according to 3.1.4 | Checkword + Offset D |
| 13 A | PI Code | Checkword + Offset A | GTC | 0 TP | PTY | Info field | Checkword + Offset B | Information Field | Checkword + Offset C | Information Field | Checkword + Offset D |
| B | PI Code | Checkword + Offset A | GTC | 1 TP | PTY | ODA according to 3.1.4 | Checkword + Offset B | PI Code | Checkword + Offset C' | ODA according to 3.1.4 | Checkword + Offset D |
| 14 A | PI Code | Checkword + Offset A | GTC | 0 TP | PTY | Variant Code | Checkword + Offset B | Information Block | Checkword + Offset C | PI (ON) | Checkword + Offset D |
| B | PI Code | Checkword + Offset A | GTC | 1 TP | PTY | TP (ON) TA (ON) M/S 0 DI Seg C1 C0 | Checkword + Offset B | PI (TN) | Checkword + Offset C' | PI (ON) | Checkword + Offset D |
| 15 A | | | | | | NOT Specified for compatibility with RBDS | | | | | |
| B | PI Code | Checkword + Offset A | GTC | 1 TP | PTY | Unused | Checkword + Offset B | PI Code | Checkword + Offset C' | Repeat Block 2 | Checkword + Offset D |

FIGURE 3

| Group type | Group type code/version | | | | | Flagged in type 1A groups | Description |
|---|---|---|---|---|---|---|---|
| | $A_3$ | $A_2$ | $A_1$ | $A_0$ | $B_0$ | | |
| 0 A | 0 | 0 | 0 | 0 | 0 | | Basic tuning and switching information only (see 3.1.5.1) |
| 0 B | 0 | 0 | 0 | 0 | 1 | | Basic tuning and switching information only (see 3.1.5.1) |
| 1 A | 0 | 0 | 0 | 1 | 0 | | Programme Item Number and slow labelling codes only (see 3.1.5.2) |
| 1 B | 0 | 0 | 0 | 1 | 1 | | Programme Item Number (see 3.1.5.2) |
| 2 A | 0 | 0 | 1 | 0 | 0 | | RadioText only (see 3.1.5.3) |
| 2 B | 0 | 0 | 1 | 0 | 1 | | RadioText only (see 3.1.5.3) |
| 3 A | 0 | 0 | 1 | 1 | 0 | | Applications Identification for ODA only (see 3.1.5.5) |
| 3 B | 0 | 0 | 1 | 1 | 1 | | Open Data Applications |
| 4 A | 0 | 1 | 0 | 0 | 0 | | Clock-time and date only (see 3.1.5.6) |
| 4 B | 0 | 1 | 0 | 0 | 1 | | Open Data Applications |
| 5 A | 0 | 1 | 0 | 1 | 0 | | Transparent Data Channels (32 channels) or ODA (see 3.1.5.8) |
| 5 B | 0 | 1 | 0 | 1 | 1 | | Transparent Data Channels (32 channels) or ODA (see 3.1.5.8) |
| 6 A | 0 | 1 | 1 | 0 | 0 | | In House applications or ODA (see 3.1.5.9) |
| 6 B | 0 | 1 | 1 | 0 | 1 | | In House applications or ODA (see 3.1.5.9) |
| 7 A | 0 | 1 | 1 | 1 | 0 | Y | Radio Paging or ODA (see 3.1.5.10 and Annex M) |
| 7 B | 0 | 1 | 1 | 1 | 1 | | Open Data Applications |
| 8 A | 1 | 0 | 0 | 0 | 0 | Y | Traffic Message Channel or ODA (see 3.1.5.12) |
| 8 B | 1 | 0 | 0 | 0 | 1 | | Open Data Applications |
| 9 A | 1 | 0 | 0 | 1 | 0 | Y | Emergency Warning System or ODA (see 3.1.5.13) |
| 9 B | 1 | 0 | 0 | 1 | 1 | | Open Data Applications |
| 10 A | 1 | 0 | 1 | 0 | 0 | | Programme Type Name |
| 10 B | 1 | 0 | 1 | 0 | 1 | | Open Data Applications |
| 11 A | 1 | 0 | 1 | 1 | 0 | | Open Data Applications |
| 11 B | 1 | 0 | 1 | 1 | 1 | | Open Data Applications |
| 12 A | 1 | 1 | 0 | 0 | 0 | | Open Data Applications |
| 12 B | 1 | 1 | 0 | 0 | 1 | | Open Data Applications |
| 13 A | 1 | 1 | 0 | 1 | 0 | Y | Enhanced Radio Paging or ODA (see Annex M) |
| 13 B | 1 | 1 | 0 | 1 | 1 | | Open Data Applications |
| 14 A | 1 | 1 | 1 | 0 | 0 | | Enhanced Other Networks information only (see 3.1.5.19) |
| 14 B | 1 | 1 | 1 | 0 | 1 | | Enhanced Other Networks information only (see 3.1.5.19) |
| 15 A | 1 | 1 | 1 | 1 | 0 | | Defined in RBDS only |
| 15 B | 1 | 1 | 1 | 1 | 1 | | Fast switching information only (see 3.1.5.20) |

REDUCED POWER CONSUMPTION

CROSS REFERENCE TO RELATED APPLICATION

This application is a continuation of U.S. patent application No. 10/691,313 filed Oct. 22, 2003, now U.S. Pat. No. 7,107,029.

FIELD OF THE INVENTION

The present invention relates to the field of frequency modulated radio receivers (FM radios), and particularly the incorporation of an FM radio into a multimedia device.

BACKGROUND TO THE INVENTION

A multimedia device may be a piece of mobile communication equipment such as a mobile telephone, PDA, or the like having functionality over and above a basic FM radio receiver. The multimedia device may however have no electronic functions other than those of a radio receiving apparatus.

The radio data system (RDS) is intended for application to VHF/FM sound broadcasts in the range 87.5 MHz to 108 MHz; these may carry either stereophonic or monophonic programs. The main objectives of RDS are to enable improved functionality of FM receivers and to make them more user-friendly by using features such as program identification, program service menu display and where applicable, automatic tuning for radios incorporated into mobile devices. This is done by providing (and using) information to supplement the audio radio transmission.

RDS is defined by the European Broadcasting Union (EBU)/Cenelec Standard EN50067: 1998, "Specification of the Radio Data System". This standard is compatible with the United States radio broadcast data system (RBDS) defined by the US National Radio Systems Committee in the specification of the radio broadcast data system, dated 9 Apr. 1998. In the following, it should be understood that the term RDS refers to both the Radio Data System and the Radio Broadcast Data System, unless otherwise specified or apparent to the person skilled in the art.

Figure 1:
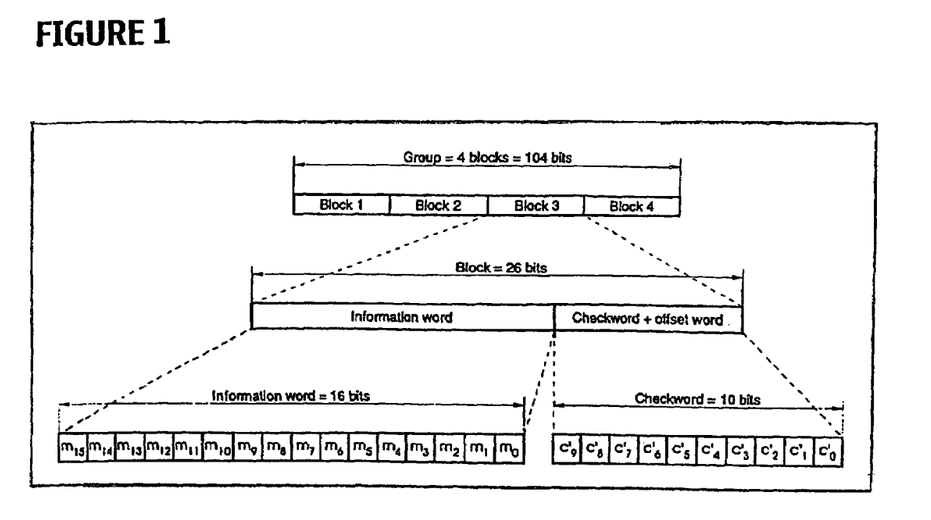
FIG. 1 shows a structure of RDS/RBDS baseband coding as is known in the art and as shown in Section 2.1 of EN50067: 1998.

FIG. 1 shows the structure of the baseband coding of the RDS standards, for example see FIG. 8 of EN50067: 1998. The largest element in the structure is called a group, consisting of 104 bits. Each group contains four blocks of 26 bits each. Each block contains an information word and a check word. Each information word comprises 16 bits, and each check word comprises 10 bits. The format and addressing structure of the information word of Blocks 1 and 2 are illustrated in FIG. 2A (see FIG. 9 of EN50067: 1998), and of the information words of Blocks 1, 2, 3 and 4 according to group type (see Block 2, FIG. 3 and explanation below) in FIG. 2B (i and ii).

Figure 2:
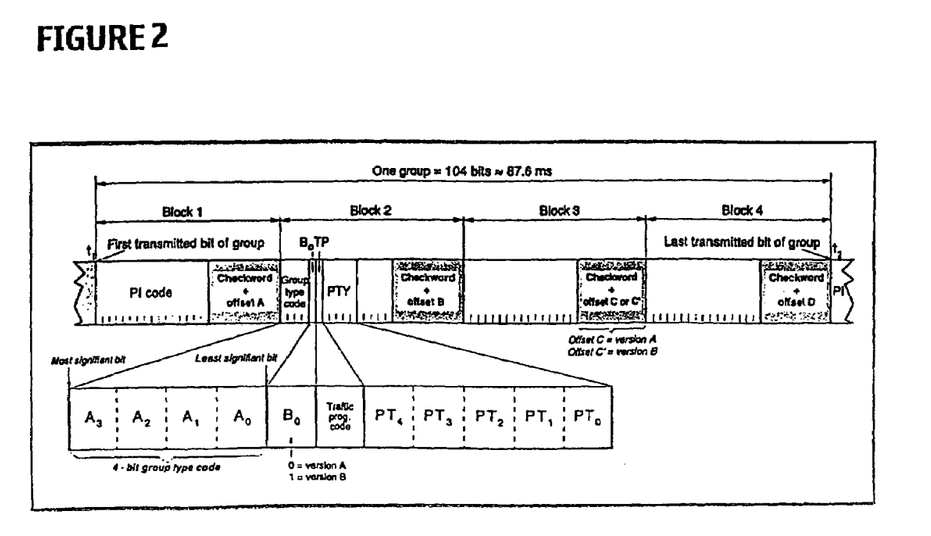
FIG. 2 shows a information word format and addressing structure of the RDS signal, as is known in the art and as shown in Section 2.2 of EN 50067: 1998.

As can be seen from FIG. 2, the first block (Block 1) in every group always contains a program identification (PI) code. Furthermore, the first four bits of the second block (Block 2) of every group are allocated to a 4-bit code that specifies how the information within the group is to be applied. According to the Standard, groups are referred to as type 0 to 15 according to binary weighting $A_3=8$, $A_2=4$, $A_1=2$, $A_0=1$. For each type (0 to 15) two versions can be defined, versions A and B (FIG. 3). The version is specified by a fifth bit ($B_0$) of block 2, and a mixture of version A and version B may be transmitted on one particular FM radio station. The Standard defines that if $B_0=0$, the PI code is inserted in block 1 only (version A) and if $B_0=1$, the PI code is inserted in block 1 and block 3 of all group types (version B).

The Standard defines that each block 2 contains a Group Type Code (GTC) defining the nature of the information word of the block (see FIG. 3, which provides a table of the group type codes for both versions A and B of the RDS encoding system and a brief description of the data content of each group). Furthermore, six locations in block 2 of every group are occupied by a program type code (PTY) and the traffic program identification (TP) code (FIG. 2 and FIG. 3).

The PI, PTY and TP codes can be decoded without reference to any block outside the ones that contain information relating to one of these codes. This is important to minimise acquisition time for these kinds of message and to retain the advantages of the short (26-bit) block length. To permit this to be done for the PI codes in block 3 of version B groups, a special offset word (commonly defined as C') is used in block 3 of version B groups. The occurrence of offset C' in block 3 of any group can then be used to indicate directly that block 3 is a PI code, without any reference to the value of $B_0$ in block 2.

Figure 4:
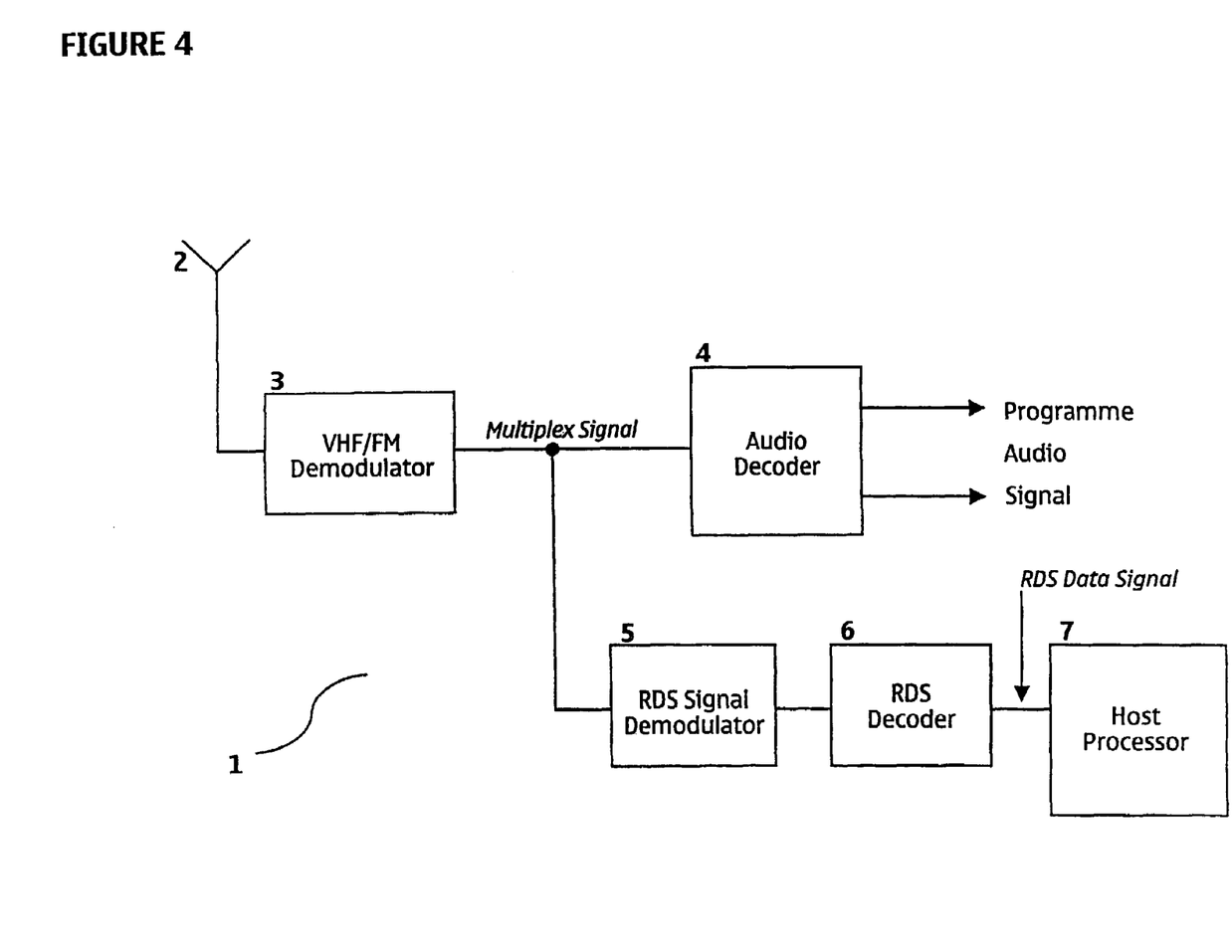
FIG. 4 shows a prior art apparatus suitable for receiving an FM audio signal and a corresponding RDS data signal.

FIG. 4 shows a circuit 1 suitable for receiving FM radio including an RDS demodulator 5 and an RDS decoder 6. The output of the RDS decoder 6 is an RDS data signal which is input to a host processor 7 of a device. The circuit 1 is arranged such that an FM signal is received at the antenna 2 and demodulated by the very high frequency (VHF)/FM demodulator 3, which outputs a multiplexed signal to an audio decoder 4 and an RDS signal demodulator 5. The audio decoder 4 outputs a program audio signal which may consist of either a single sound channel (monophonic) or two sound channels (stereophonic). The program audio signal output by audio decoder 4 may then be amplified and used by the multimedia device. The RDS signal demodulator 5 demodulates the RDS signal from the multiplexed signal and outputs this to an RDS decoder 6. The RDS decoder 6 outputs an RDS data signal corresponding to the information word of a block. The RDS decoder 6 signals an interrupt to the host processor 7 when a new data block has been decoded. This can be after every block, which corresponds to one interrupt every 22 ms.

It is common for multimedia devices to incorporate an idle mode in order to reduce current consumption and increase battery life. In such an idle mode, the host processor of such a multimedia device may be substantially deactivated, such that a core of the processor is only activated in response to a particular flag being set in an on-chip register. This may occur, for example, upon the depression of a key of the multimedia device. Typically an FM radio application incorporated into a multimedia device operates when the multimedia device is in such an idle mode allowing for reduced current consumption by the radio. However, with the addition of a circuitry capable of decoding RDS as shown in FIG. 4, the processor of the multimedia device must wake up every 22 or 44 ms to service the interrupt. This activity of the host processor 7 results in an increase in current consumption. In the case of the multimedia device being battery operated, the inclusion of a circuitry capable of decoding RDS to an FM radio application may lead to a reduced radio listening time and further a reduced multimedia device operation time.

One option for mitigating this problem is to incorporate buffering in the circuit so that the host processor may receive an interrupt once every two blocks have been decoded, corresponding to an interrupt interval of 44 ms. However, this still requires the processor to be activated frequently and to be activated even if non-required data is being received.

It as an aim of embodiments of the present invention to solve at least one of the problems as described above.

SUMMARY OF THE INVENTION

According to a first aspect of the invention there is provided a radio frequency receiver for receiving supplementary data transmitted with a radio station signal, said supplementary data comprising one or more information word fields containing supplementary data transmitted with the radio station signal, said receiver comprising:

a host processor for processing said supplementary data;

a supplementary data demodulator and decoder for demodulating and decoding a received radio signal to generate a stream of bits representing one or more information word fields;

a information word type memory for storing one or more information word type fields;

detection circuitry arranged to receive and compare the information word type field decoded by the supplementary data decoder with one or more information word type fields stored in the information word type memory, and to provide a matched condition signal in response to a match between one or more decoded information word type fields and one or more of said corresponding stored information word types fields, and wherein the receiver is arranged to, in response to the matched condition signal, cause the corresponding supplementary data to be processed by means of the host processor.

The receiver and the supplementary data may conform to RDS/RBDS standard. In such cases, the receiver may be arranged to store one or more Block 2 codes and the detection circuitry may be arranged to provide the matched condition signal in response to a match between the one or more received decoded Block 2 information word type fields and one or more of said corresponding stored Block 2 information word types fields.

The information word type memory may be arranged to store one or more GTC(s), one or more TP code(s), one or more PTY code(s) or one or more TA code(s).

The information word type memory may be programmable. Specifically, information word type memory may be user-programmable.

The receiver may be arranged to process the supplementary data using the host processor during an already non-idle period of the host processor. This non-idle period may be a period when the host processor is processing GSM/TDMA/WCDMA data.

The receiver may further comprise a buffer memory for storing the decoded supplementary data prior to the decoded supplementary being processed by the host processor. The buffer memory may be a FIFO (first in, first out) memory. The receiver may further comprise a latch responsive to the detection circuitry for controlling the flow of supplementary data to the buffer memory. The latch may be arranged to receive at a data input the decoded supplementary data, and at a clock input a match condition signal generated by the detection circuitry responsive to a match. The receiver may be arranged such that the host processor reads the contents of the buffer memory upon receipt of an interrupt. The interrupt may be generated by circuitry external to the receiver, may be initiated by the user, may be generated in response to the buffer memory reaching its capacity or generated in response to an instruction to process GSM burst data.

In the embodiment that comprises a buffer memory, the receiver may be arranged such that the host processor reads the contents of the buffer memory during GSM burst activity. The receiver may be incorporated into a device for communicating over a GSM network, and said device may be a mobile phone.

The receiver may be arranged to be capable of receiving and decoding the radio station signal.

The radio station signal may be an audio signal and the receiver may be arranged to be capable of presenting the audio signal to a user, for example by means of a loudspeaker or other audio reproduction means.

The radio station signal may be a frequency modulated signal or an amplitude modulated signal.

In a second aspect, the present invention provides a mobile terminal comprising a radio frequency receiver for receiving supplementary data transmitted with a radio station signal, said supplementary data comprising one or more information word fields containing supplementary data transmitted with the radio station signal, said receiver comprising:

a host processor for processing said supplementary data;

a supplementary data demodulator and decoder for demodulating and decoding a received radio signal to generate a stream of bits representing one or more information word fields;

a information word type memory for storing one or more information word type fields;

detection circuitry arranged to receive and compare the information word type field decoded by the supplementary data decoder with one or more information word type fields stored in the information word type memory, and to provide a matched condition signal in response to a match between one or more decoded information word type fields and one or more of said corresponding stored information word types fields, and wherein the receiver is arranged to, in response to the matched condition signal, cause the corresponding supplementary data to be processed by means of the host processor.

In a third aspect, the present invention provides a method for receiving supplementary data transmitted with a radio station signal, said supplementary data comprising one or more information word fields containing supplementary data transmitted with the radio station signal, said method comprising:

processing said supplementary data by a processing means;

demodulating and decoding a received radio signal to generate a stream of bits representing the one or more information word fields;

storing one or more information word type fields in an information word field store;

receiving and comparing the information word type field decoded by the decoder with one or more of the stored information word type fields, and in response to a match therebetween, causing the corresponding supplementary data to be processed by group to be processed.

DESCRIPTION OF THE DRAWINGS

The present invention will now be described by way of example, with reference to the accompanying drawings.

FIG. 2B (i and ii) shows the information word format and addressing structure of Blocks 1, 2, 3 and 4 according to group type.

FIG. 3 shows a table of group type codes used in the RDS messages, as are known in the art and as shown in Section 3.1.3 of EN50067: 1998.

DESCRIPTION OF PREFERRED EMBODIMENTS OF THE PRESENT INVENTION

Figure 5:
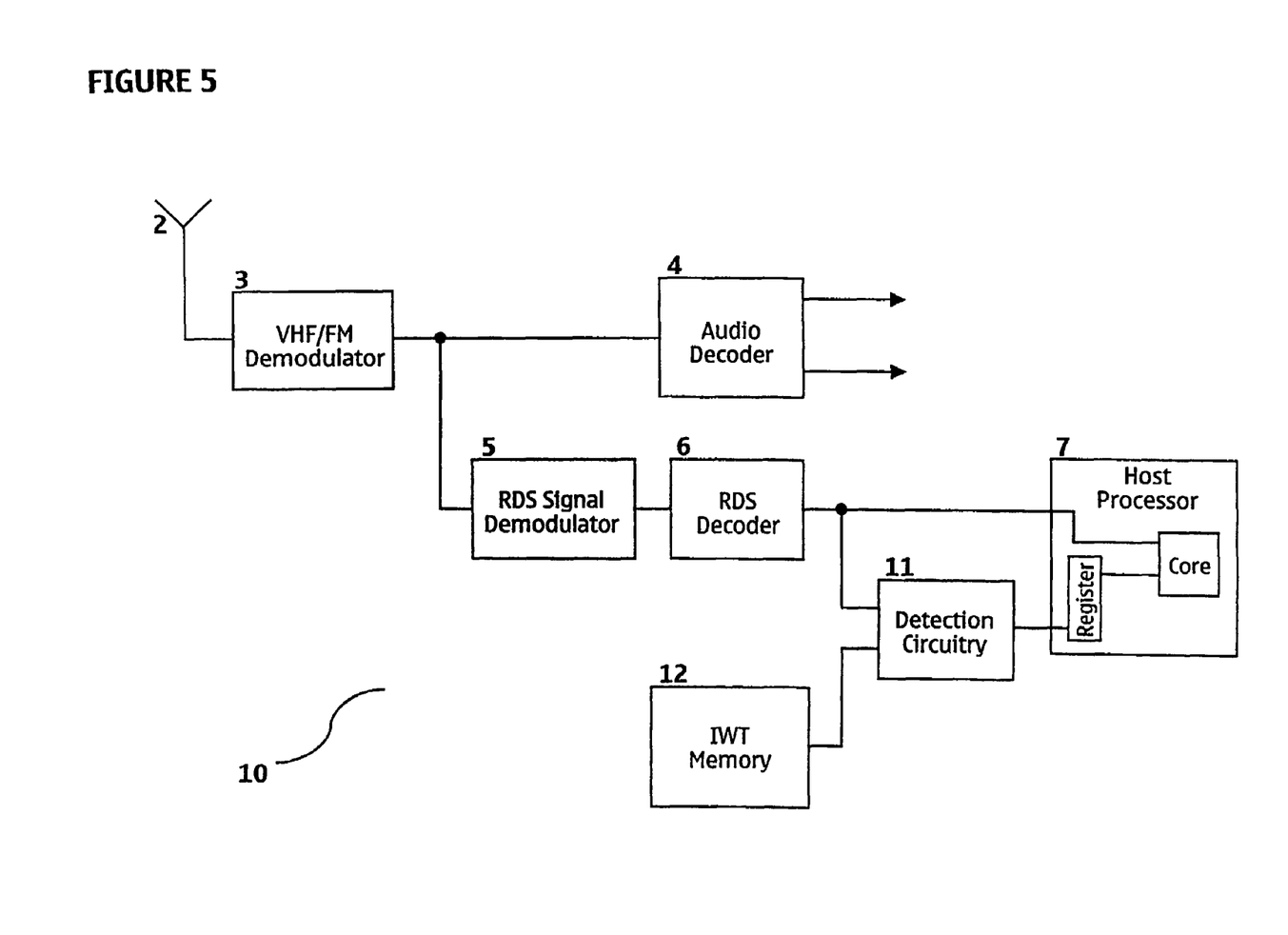
FIG. 5 shows an apparatus suitable for receiving an FM audio signal and a corresponding RDS data signal in accordance with an embodiment of the present invention.

FIG. 5 shows a preferred embodiment of the present invention, featuring a circuit 10 sharing some features with that shown in FIG. 4. Features of FIG. 5 having similar functions to features of FIG. 4 have been given like reference numerals. Only the differences are described herein.

The circuit 10 includes a detection circuitry 11 and an information word type (IWT) memory 12. The host processor 7 contains a register 13 and a processor core 14. The IWT memory 12 contains at least one group type code (GTC). The one or more group type codes may be written to the memory by the host processor 7, or another piece of circuitry (not shown). Alternatively, the IWT memory 12 may be a read only memory (ROM) containing one or more predetermined GTCs.

The detection circuitry 11 receives the RDS data group signal output by the RDS decoder 6. The RDS data group signal includes the GTC in the information word of Block 2. The detection circuitry 11 identifies the received GTC from the RDS data group signal and searches for a match between the received GTC, and the one or more GTCs stored in the GT memory 12.

If a positive match is found by the detection circuitry 11, then the detection circuitry 11 outputs a match signal to the host processor 7, which causes the host processor to set a flag in a register 13. The setting of this flag causes the processor core 14 to be activated and process the corresponding RDS data block received from the RDS decoder 6. Alternatively, if no match is found between the received GTC and the one or more GTCs stored in the IWT memory 12, then no flag is set and the received GTC is discarded and the RDS data group signal is not processed by the processor core 14.

In another embodiment, the IWT memory 12 stores program type (PTY) codes and/or traffic programme identification (TP) codes. In these embodiments, the detection circuitry 11 outputs a flag in response to the detection of a match between a PTY code and/or a TP code identified in the received signal and a respective PTY code and/or TP code in the IWT memory 12.

In a preferred embodiment, the IWT memory 12 contains one or more Block 2 codes and the detection cirtcuitry 11 is arranged to output a flag in response to the detection of a corresponding match. In a specific embodiment, the IWT memory 12 stores one or more PTY, TP, TA and GTC codes and the circuitry 11 is arranged to output a flag in response to the detection of one or more corresponding matches. A PTY code match is possible irrespective of the other bits in Block 2.

The IWT memory 12 may contain one or more Block 1, Block 2, Block 3 and/or Block 4 information word codes and the detection circuitry 11 is arranged to output a flag upon the detection of a corresponding match.

The IWT memory codes for storing in the memory 12 are preferably chosen to assist in the enhancement of the user experience whilst at the same time reducing power consumption of processor 7.

The configuration of the data connections between the units shown in the figures is not limited to those examples that are shown. For example, the RDS decoder need not be connected directly to the host processor. In an alternative example, some or all of the units that exchange data could be interconnected by a common data bus. The audio decoder 4 may be powered down while the receiver is looking for a match. Upon detection of a match by the detection circuitry 11, the audio decoder 4 may be powered up in order to output the audio channel or channels of the received signal. Thus, the audio output of the receiver is only activated for a predetermined program type.

Figure 6:
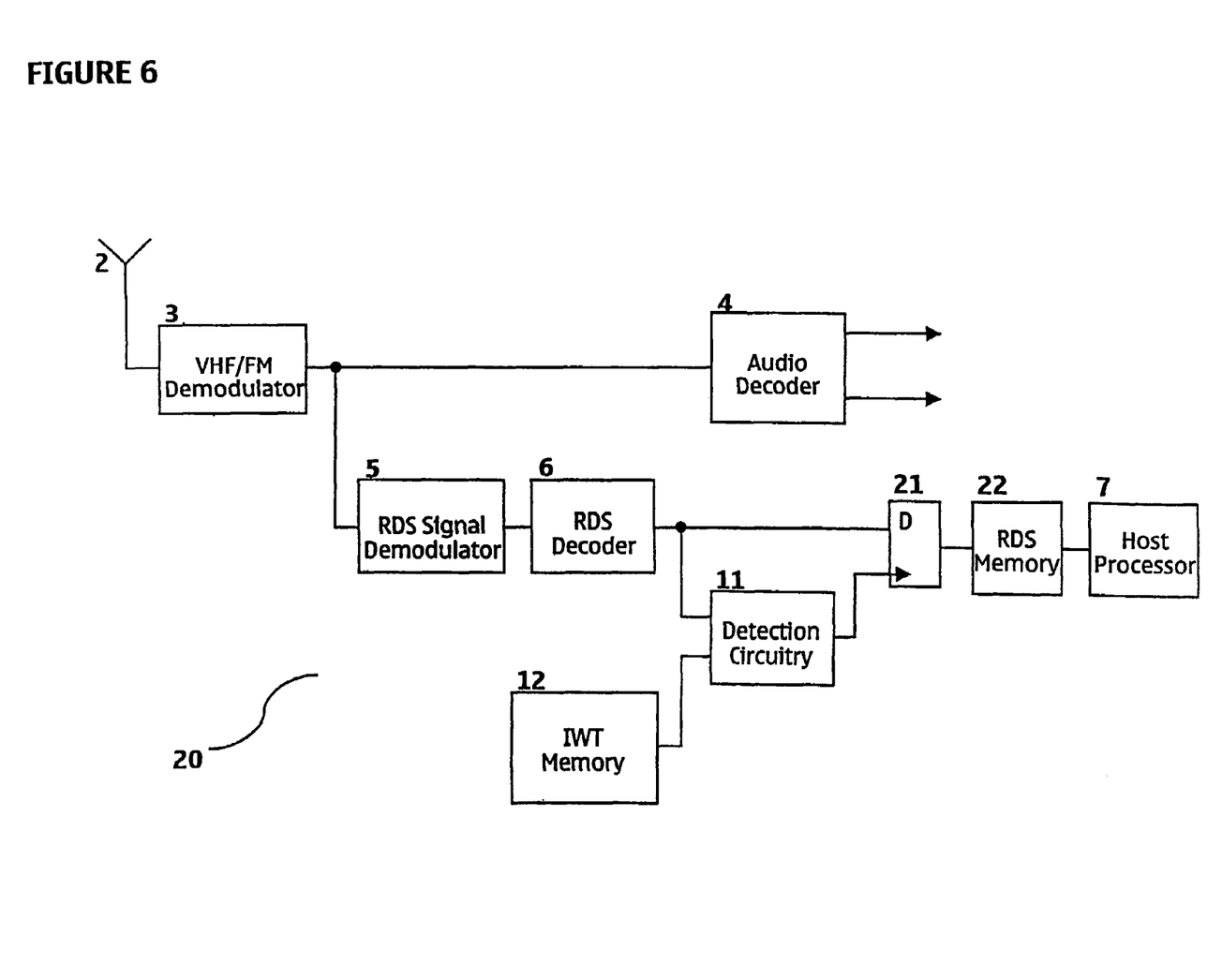
FIG. 6 shows an apparatus suitable for receiving an FM audio signal and a corresponding RDS data signal the apparatus comprising an RDS memory in accordance with an embodiment of the present invention.

FIG. 6 shows an alternative apparatus, featuring a circuit 20 sharing some features shown in FIG. 5. Features of FIG. 6 having similar functions to features of FIG. 5 have been given like reference numerals. Only the differences are described herein.

The circuit 20 includes an RDS decoder 6, a detection circuit 11, and a host processor 7 as shown in FIG. 5. Circuit 20 further comprises a latch 21 and an RDS memory 22 connected in series between the RDS decoder 6 and the host processor 7. The latch 21 may be a D-type latch. The latch 21 receives as a data input the output of RDS decoder 6, and as a clock input the output of detection circuitry 11. The RDS memory 22 receives as an input the output of the latch 21. The RDS memory 22 may be accessed by the host processor 7.

The RDS decoder 6 and detection circuitry 11 generate the same outputs as described above. The latch 21 acts so as to pass only data received from the RDS decoder when the match signal output by the detection circuitry 11 is set. This data is then stored in RDS memory 22, ready for access by the host processor 7. Hence, the circuit 20 acts so as to only buffer, using RDS memory 22, received blocks of the RDS data signal that are determined as being relevant to the host processor 7 by the IWT memory 12.

In an alternative apparatus the RDS memory 22 is configured to store the contents of blocks 2, 3 (or 3') and 4 in response to a GTC match in block 2. This may be carried out by implementing a timer on the clock input of latch 21. The timer is arranged to output a pulse upon detection of a match by the detection circuitry 11. The length of this pulse corresponds to the length of time required for blocks 2, 3 (or 3') and 4 to pass through the latch and into the RDS memory 22. In the preferred embodiment, the pulse length is 66 ms.

The RDS memory 22 may be a FIFO memory. Alternatively, the RDS memory 22 may be any other suitable type of memory.

The host processor 7 is configured to read from the RDS memory 22 upon receipt of an interrupt. This interrupt may be generated by the other circuitry of the multimedia device, and may or may not be connected to the FM radio of the multimedia device. The interrupt may for example be generated by a user performing a task with the multimedia device that requires the use of the host processor 7 that is not related to the radio of the multimedia device. Alternatively, the interrupt may be triggered by the user. For example, the user may select a refresh station list option incorporated into the multimedia device. In another alternative apparatus, the interrupt may be generated in response to the RDS Memory 22 reaching its capacity.

In an embodiment of the present invention, the multimedia device may be a communications device capable of operating in a telecommunication system such as GSM, UMTS, or the like. For example, in the case of a multimedia device having GSM functionality the host processor 7 would normally be in an idle mode in a time interval between transmitting data bursts to a network, this is called GSM idle mode. The host processor 7 of such a multimedia device receives interrupts intermittently in order to process GSM burst data. In such a device, it would be possible for the host processor to access and process the data stored in the RDS memory 22, upon the receipt of an interrupt to process GSM burst data. The invention is correspondingly applicable to TDMA and WCDMA (TDD/FDD) and more generally 2G, 2.5G, 3G, 4G and variations thereof.

Accordingly, in embodiments of the present invention the host processor can be required to process RDS data relatively infrequently receiving fewer interrupts than would be experienced using a conventional RDS decoding circuit. Embodiments of the present invention can thus advantageously allow reduced power consumption in a multimedia device incorporating a radio receiver incorporating RDS.

As described above, the IWT memory may store information word types codes which are compared with the information word type codes of received groups to determine whether they should be processed by the host processor. In the specific example of an RDS system, the IWT memory may store 4-bit group type GTCs (including the 4 bits $A_3, A_2, A_1,$ and $A_0$) or 5-bit group types including GTCs and version numbers (including the 5 bits $A_3, A_2, A_1,$ and $A_0$ and $B_0$). In each case, a match between a stored IWT and a received IWT may be determined when each of the bits of the stored IWT equal each corresponding bit of the received IWT. In another embodiment a match may be declared when a predetermined sub-set of the bits match: for instance the 4 bits $A_3, A_2, A_1,$ and $A_0$ in the case of a 5-bit stored group type.

In an alternative embodiment of the present invention, the radio receiver is powered down when receiving blocks 3 (or 3'), 4 and 1 and is only powered up for receiving block 2. The receiver does this by counting a specific number of RDS clock cycles after receiving a block 2 such that the receiver powers up to receive the next block 2. This is advantageous when the receiver is used in a background mode to either wake up when a specific group, program type code (PTY) or any other group type code specified is received. In this embodiment, the receiver may be programmed so as to only wake up in order to receive the block 2, and then to only send an interrupt to the processor upon receipt of a block containing an alternate frequency code. This advantageously allows the receiver to maintain an alternate frequency list while the user is not listening to the radio channel, or alternatively allows the radio receiver to be powered up when a certain program type is detected.

Embodiments may be implemented using a power management integrated circuit incorporated into the multimedia device. The power management integrated circuit is adapted to allow individual circuitry or areas of circuitry within the multimedia device to be switched off or on independently. Such a power management integrated circuit advantageously allows the multimedia device to reduce current consumption during the performance of different functions. The radio receiver may be powered by a power management integrated circuit. A switch incorporated into the power management integrated circuit provides power to the radio receiver, said switch being responsive to an output of the RDS decoder 6. The RDS decoder 6 may also be powered by the power management integrated circuit.

The above embodiment advantageously allows the receiver to enter a substantially powered down state wherein far less current is drawn for three quarters of the time, when blocks containing group type codes that are not stored in the memory are received. The receiving circuitry is only fully powered up for a quarter of the time, when a block 2 is received, and for a short period of time after a block 2 having a GTC that is stored in the IWT memory is received.

An advantage of embodiments of the present invention as described above is that the RDS data is only output in response to a match, which can only occur when the decoder is synchronized with the RDS data signal of an appropriate radio channel. In such embodiments the previously discussed problem of incorrect RDS data being output when the receiver is not synchronised may be addressed.

Embodiments of the present invention have been described in the context of FM radio and the RDS and RBDS standards. However, it should be appreciated that embodiments of the present invention can be used with any other type of information system featuring the broadcast of supplementary data with a radio station. This may, for example, be the SWIFT system defined in standard ETS-300751 issued by the European Telecommunications Standards Institute. Alternatively, this may take the form of the inclusion of supplementary data applied to amplitude modulation broadcast stations. The radio signals are preferably non-televisual signals. The information word of the supplementary data may contain error detection and/or error correction capability.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. Device circuitry for providing first and second transmission functions, the device circuitry comprising radio frequency receiver circuitry to provide the first transmission function and telecommunications circuitry to provide the second transmission function, the radio frequency receiver circuitry arranged to process broadcast transmission data received by the radio frequency receiver circuitry, and wherein the radio frequency receiver circuitry is arranged to have active and idle modes, the active mode enabling the processing of received broadcast transmission data, the telecommunications circuitry arranged to process telecommunications transmission data, and wherein the telecommunications circuitry is arranged to have active and idle modes, the active mode enabling the processing of telecommunications transmission data, the device circuitry further comprising power management circuitry arranged to move the radio frequency receiver circuitry from the idle state to the active state in correspondence with when the telecommunications circuitry is in the active mode.

2. Device circuitry according to claim 1, wherein the radio frequency receiver circuitry is arranged to be in the idle mode in a time interval between the telecommunications circuitry transmitting data to a network.

3. Device circuitry according to claim 1, wherein the radio frequency receiver circuitry is arranged to be in the idle mode during GSM idle modes.

4. Device circuitry according to claim 1, wherein the radio frequency receiver circuitry comprises storage circuitry to store received broadcast transmission data, and wherein radio frequency circuitry is arranged to access and process stored broadcast transmission data when the telecommunications circuitry receives an interrupt to process telecommunications transmission data.

5. Device circuitry according to claim 1, wherein the radio frequency receiver circuitry comprises storage circuitry to store received broadcast transmission data, and wherein radio frequency circuitry is arranged to access and process stored broadcast transmission data when the telecommunications circuitry receives an interrupt to process GSM telecommunications transmission data.

6. Device circuitry according to claim 1, wherein the telecommunications circuitry is arranged to operate according to a GSM telecommunications system.

7. Device circuitry according to claim 1, wherein the telecommunications circuitry is arranged to operate according to a UMTS telecommunications system.

8. Device circuitry according to claim 1, wherein the telecommunications circuitry is arranged to operate according to a TDMA telecommunications system.

9. Device circuitry according to claim 1, wherein the telecommunications circuitry is arranged to operate according to a WCDMA telecommunications system.

10. Device circuitry according to claim 1, wherein the telecommunications circuitry is arranged to operate according to a 2G, 2.5G, 3G. 4G telecommunications system or a variation thereof.

11. Device circuitry according to claim 1, wherein the radio frequency receiver circuitry is arranged to conform to a RDS standard.

12. Device circuitry according to claim 1, wherein the radio frequency receiver circuitry is arranged to conform to a RBDS standard.

13. Device circuitry according to claim 1, wherein the radio frequency receiver circuitry is arranged to process non-televisual data signals.

14. A multimedia device comprising the device circuitry of claim 1.

15. Device comprising the device circuitry of claim 1.

16. Device circuitry according to claim 1, wherein the radio frequency receiver circuitry is for receiving supplementary data transmitted with a radio station signal, said supplementary data comprising one or more information word fields containing supplementary data transmitted with the radio station signal, said receiver circuitry comprising:

a host processor for processing said supplementary data;

a supplementary data demodulator and decoder for demodulating and decoding a received radio signal to generate a stream of bits representing one or more information word fields;

a information word type memory for storing one or more information word type fields;

detection circuitry arranged to receive and compare the information word type field decoded by the supplementary data decoder with one or more information word type fields stored in the information word type memory, and to provide a matched condition signal in response to a match between one or more decoded information word type fields and one or more of said corresponding stored information word types fields, and wherein the receiver is arranged to, in response to the matched condition signal, cause the corresponding supplementary data to be processed by means of the host processor.

17. Device circuitry as claimed in claim 16, wherein the receiver circuitry and the supplementary data conform to RDS standard.

18. Device circuitry as claimed in claim 16, wherein the receiver circuitry and the supplementary data conform to RBDS standard.

19. Device circuitry as claimed in claim 16, wherein the receiver circuitry and the supplementary data conform to RDS standard information word type memory and wherein the receiver circuitry is arranged to store one or more Block 2 codes and the detection circuitry is arranged to provide the matched condition signal in response to a match between the one or more received decoded Block 2 information word type fields and one or more of said corresponding stored Block 2 information word types fields.

20. Device circuitry as claimed in claim 16, wherein the receiver circuitry and the supplementary data conform to RBDS standard information word type memory and wherein the receiver circuitry is arranged to store one or more Block 2 codes and the detection circuitry is arranged to provide the matched condition signal in response to a match between the one or more received decoded Block 2 information word type fields and one or more of said corresponding stored Block 2 information word types fields.

21. Device circuitry as claimed in claim 16, wherein the information word type memory is arranged to store one or more GTC(s).

22. Device circuitry as claimed in claim 16, wherein the information word type memory is arranged to store one or more TP code(s).

23. Device circuitry as claimed in claim 16, wherein the information word type memory is arranged to store one or more PTY code(s).

24. Device circuitry as claimed in claim 16, wherein the information word type memory is arranged to store one or more TA code(s).

25. Device circuitry as claimed in claim 16, wherein the information word type memory is programmable.

26. Device circuitry as claimed in claim 16, wherein the information word type memory is user-programmable.

27. Device circuitry as claimed in claim 16, further comprising a buffer memory for storing the decoded supplementary data prior to the decoded supplementary being processed by the host processor.

28. Device circuitry as claimed in claim 27, further comprising a latch responsive to the detection circuitry for controlling the flow of supplementary data to the buffer memory.

29. Device circuitry as claimed in claim 27, wherein the receiver circuitry is arranged such that the host processor reads the contents of the buffer memory upon receipt of an interrupt.

30. Device circuitry as claimed in claim 29, wherein the interrupt is generated by circuitry external to the receiver circuitry.

31. Device circuitry as claimed in claim 27, wherein the receiver circuitry is arranged such that the host processor reads the contents of the buffer memory during GSM burst activity.

32. A method of managing device circuitry power consumption, the device circuitry for providing first and second transmission functions, the device circuitry comprising radio frequency receiver circuitry to provide the first transmission function and telecommunications circuitry to provide the second transmission function, the radio frequency receiver circuitry arranged to process broadcast transmission data received by the radio frequency receiver circuitry, and wherein the radio frequency receiver circuitry is arranged to have active and idle modes, the active mode enabling the processing of received broadcast transmission data, the telecommunications circuitry arranged to process telecommunications transmission data, and wherein the telecommunications circuitry is arranged to have active and idle modes, the active mode enabling the processing of telecommunications transmission data, wherein the method comprises moving the radio frequency receiver circuitry from the idle state to the active state in correspondence with when the telecommunications circuitry is in the active mode.

33. A radio frequency receiver for receiving supplementary data transmitted with a radio station signal, said supplementary data comprising one or more information word fields containing supplementary data transmitted with the radio station signal, said receiver comprising:

a host processor for processing said supplementary data the host processor having an active state and an idle state;

a supplementary data demodulator and decoder for demodulating and decoding a received radio signal to generate a stream of bits representing one or more information word fields;

a information word type memory for storing one or more information word type fields;

detection circuitry arranged to receive and compare the information word type field decoded by the supplementary data decoder with one or more information word type fields stored in the information word type memory, and to provide a matched condition signal in response to a match between one or more decoded information word type fields and one or more of said corresponding stored information word types fields, and wherein the receiver is arranged to, in response to the matched condition signal, cause the host processor to move to the active state to process the corresponding supplementary data.

34. A method for receiving supplementary data transmitted with a radio station signal, said supplementary data comprising one or more information word fields containing supplementary data transmitted with the radio station signal, said method comprising:

processing said supplementary data by a processing means having an active state and an idle state;

demodulating and decoding a received radio signal to generate a stream of bits representing the one or more information word fields;

storing one or more information word type fields in an information word field store;

receiving and comparing the information word type field decoded by the decoder with one or more of the stored information word type fields, and in response to a match therebetween, causing the processing means to move to the active state to process the corresponding supplementary data.

* * * * *